US012754468B2

(12) United States Patent
Chen et al.

(10) Patent No.: US 12,754,468 B2
(45) Date of Patent: Oct. 6, 2026

(54) ILLUMINATION SYSTEM HAVING MULTIPLE LIGHT SOURCE MODULES AND PROJECTION DEVICE

(71) Applicant: Coretronic Corporation, Hsin-Chu (TW)

(72) Inventors: Kuan-Lun Chen, Hsin-Chu (TW); Kai-Jiun Wang, Hsin-Chu (TW); Ming-Tsung Weng, Hsin-Chu (TW); Shun-Tai Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 296 days.

(21) Appl. No.: 18/506,117

(22) Filed: Nov. 9, 2023

(65) Prior Publication Data

US 2024/0171713 A1 May 23, 2024

(30) Foreign Application Priority Data

Nov. 18, 2022 (CN) ......................... 202211445125.6

(51) Int. Cl.
*G03B 21/20* (2006.01)

(52) U.S. Cl.
CPC ..... *G03B 21/2066* (2013.01); *G03B 21/2013* (2013.01); *G03B 21/2033* (2013.01); *G03B 21/2073* (2013.01); *G03B 21/208* (2013.01)

(58) Field of Classification Search
CPC ............ G03B 21/2013; G03B 21/2033; G03B 21/2066; G03B 21/2073; G03B 21/208
See application file for complete search history.

(56) References Cited

U.S. PATENT DOCUMENTS 7,980,706 B2 7/2011 Wang
8,870,384 B2 10/2014 Imai et al.
(Continued)

FOREIGN PATENT DOCUMENTS

CN 1467534 1/2004
CN 1624575 6/2005
(Continued)

OTHER PUBLICATIONS

"Notice of allowance of Related U.S. Appl. No. 17/881,618", issued on Mar. 11, 2025, p. 1-p. 15.
(Continued)

*Primary Examiner* — Bao-Luan Q Le
(74) *Attorney, Agent, or Firm* — JCIPRNET

(57) ABSTRACT

An illumination system that provides an illumination beam is provided. The illumination system includes a first light source module, a second light source module, a third light source module, a first optical element, a second optical element, and a third optical element. The first light source module and the second light source module provide a first color light beam, a second color light beam, and a third color light beam. The third light source module provides a third color light beam. The first optical element, the second optical element and the third optical element are disposed on transmission paths of the first color light beam, the second color light beam and the third color light beam, and the first light source module and the second light source module are respectively located on opposite sides of the first optical element and the second optical element.

36 Claims, 5 Drawing Sheets

(56) References Cited

U.S. PATENT DOCUMENTS

| | | | | |
|---|---|---|---|---|
| 9,004,699 | B2 | 4/2015 | Huang | |
| 11,320,727 | B2 | 5/2022 | Hsu et al. | |
| 11,333,963 | B2 | 5/2022 | Lin et al. | |
| 11,442,351 | B2 | 9/2022 | Lin et al. | |
| 11,588,413 | B2 | 2/2023 | Kitahama et al. | |
| 2003/0164945 | A1 | 9/2003 | Lee | |
| 2004/0263500 | A1 | 12/2004 | Sakata | |
| 2005/0117337 | A1 | 6/2005 | Ishii et al. | |
| 2006/0103809 | A1 | 5/2006 | Bierhuizen | |
| 2008/0094577 | A1 | 4/2008 | Krijn et al. | |
| 2008/0192205 | A1 | 8/2008 | De Vaan et al. | |
| 2008/0259284 | A1 | 10/2008 | Maeda et al. | |
| 2009/0262309 | A1 | 10/2009 | Yamauchi | |
| 2010/0182572 | A1 | 7/2010 | Huang | |
| 2010/0245771 | A1 | 9/2010 | Huang | |
| 2011/0007279 | A1 | 1/2011 | Silverstein et al. | |
| 2011/0096298 | A1 | 4/2011 | Huang et al. | |
| 2011/0096299 | A1 | 4/2011 | Huang et al. | |
| 2011/0317131 | A1 | 12/2011 | Miyazaki | |
| 2012/0133904 | A1 | 5/2012 | Akiyama | |
| 2012/0188469 | A1 | 7/2012 | Fukui | |
| 2013/0169937 | A1 | 7/2013 | Ouderkirk et al. | |
| 2013/0300948 | A1 | 11/2013 | Jannard et al. | |
| 2014/0002514 | A1 | 1/2014 | Richards | |
| 2014/0333900 | A1 | 11/2014 | Aboshi et al. | |
| 2014/0333902 | A1 | 11/2014 | Aboshi et al. | |
| 2014/0354956 | A1* | 12/2014 | Yamada | H04N 9/3164 353/20 |
| 2015/0124227 | A1 | 5/2015 | Kobayashi | |
| 2015/0222864 | A1 | 8/2015 | Inoko | |
| 2015/0350588 | A1 | 12/2015 | Lim et al. | |
| 2015/0373312 | A1 | 12/2015 | Miura | |
| 2016/0131315 | A1 | 5/2016 | Zhang et al. | |
| 2016/0139419 | A1 | 5/2016 | Huang | |
| 2016/0211652 | A1 | 7/2016 | Fischer et al. | |
| 2016/0286180 | A1 | 9/2016 | Otani et al. | |
| 2016/0298827 | A1* | 10/2016 | Jurik | F21V 9/08 |
| 2017/0176845 | A1 | 6/2017 | Ogino | |
| 2018/0231882 | A1 | 8/2018 | Miura | |
| 2019/0155041 | A1 | 5/2019 | Jurik et al. | |
| 2019/0235369 | A1 | 8/2019 | Janssens et al. | |
| 2019/0250493 | A1 | 8/2019 | Fujii | |
| 2019/0310539 | A1 | 10/2019 | Yamagishi et al. | |
| 2020/0004121 | A1 | 1/2020 | Shimamura | |
| 2020/0068180 | A1 | 2/2020 | Kurata et al. | |
| 2020/0174355 | A1 | 6/2020 | Liu et al. | |
| 2020/0224854 | A1* | 7/2020 | Jurik | F21V 9/40 |
| 2020/0249449 | A1 | 8/2020 | Okuno et al. | |
| 2020/0301156 | A1* | 9/2020 | Nagahara | G02B 27/283 |
| 2021/0191250 | A1 | 6/2021 | Kurita et al. | |
| 2021/0286247 | A1* | 9/2021 | Hsu | G03B 21/2066 |
| 2021/0286248 | A1 | 9/2021 | Lin et al. | |
| 2021/0294200 | A1 | 9/2021 | Pan | |
| 2021/0321066 | A1 | 10/2021 | Yogo | |
| 2021/0341824 | A1* | 11/2021 | Lin | G03B 21/208 |
| 2022/0255967 | A1 | 8/2022 | Goyal et al. | |
| 2022/0365413 | A1 | 11/2022 | Wang et al. | |
| 2022/0373874 | A1 | 11/2022 | Lin et al. | |
| 2023/0116022 | A1 | 4/2023 | Chen et al. | |
| 2023/0140825 | A1 | 5/2023 | Chang et al. | |
| 2024/0045316 | A1 | 2/2024 | Chang et al. | |
| 2025/0088612 | A1 | 3/2025 | Wang et al. | |
| 2025/0347984 | A1 | 11/2025 | Weng et al. | |

FOREIGN PATENT DOCUMENTS

| | | | | |
|---|---|---|---|---|
| CN | 101044430 | | 9/2007 | |
| CN | 102520571 | | 6/2012 | |
| CN | 102621791 | | 8/2012 | |
| CN | 102854622 | | 1/2013 | |
| CN | 202710914 | | 1/2013 | |
| CN | 202886821 | | 4/2013 | |
| CN | 103207509 | | 7/2013 | |
| CN | 104791717 | | 7/2015 | |
| CN | 204595412 | | 8/2015 | |
| CN | 105190165 | | 12/2015 | |
| CN | 104020632 | | 8/2016 | |
| CN | 106125482 | | 11/2016 | |
| CN | 104614867 | | 1/2017 | |
| CN | 106997142 | | 8/2017 | |
| CN | 107436528 | | 12/2017 | |
| CN | 107870444 | | 4/2018 | |
| CN | 107885021 | | 4/2018 | |
| CN | 108225182 | | 6/2018 | |
| CN | 108614385 | | 10/2018 | |
| CN | 208060924 | | 11/2018 | |
| CN | 109557750 | | 4/2019 | |
| CN | 109976078 | | 7/2019 | |
| CN | 209265161 | | 8/2019 | |
| CN | 110275375 | | 9/2019 | |
| CN | 110520793 | | 11/2019 | |
| CN | 209845157 | | 12/2019 | |
| CN | 210038427 | | 2/2020 | |
| CN | 211375295 | | 8/2020 | |
| CN | 211403092 | | 9/2020 | |
| CN | 113391506 | | 9/2021 | |
| CN | 113391507 | | 7/2022 | |
| CN | 114879439 | | 8/2022 | |
| CN | 114879439 | A * | 8/2022 | H01S 5/40 |
| CN | 115576166 | | 1/2023 | |
| CN | 113589635 | | 3/2023 | |
| CN | 116047849 | | 5/2023 | |
| EP | 2852160 | | 3/2015 | |
| EP | 3521749 | | 8/2019 | |
| EP | 3879333 | | 9/2021 | |
| EP | 3904958 | | 11/2021 | |
| JP | H09510026 | | 10/1997 | |
| JP | 2006337428 | | 12/2006 | |
| JP | 2011242537 | | 12/2011 | |
| JP | 2012533087 | | 12/2012 | |
| KR | 20150097098 | | 8/2015 | |
| TW | 201516555 | | 5/2015 | |
| TW | 201541181 | | 11/2015 | |
| WO | 2011146267 | | 11/2011 | |
| WO | 2018196195 | | 11/2018 | |
| WO | 2020253166 | | 12/2020 | |

OTHER PUBLICATIONS

"Search Report of Europe Counterpart Application", issued on Mar. 22, 2024, p. 1-p. 8.

"Search Report of Europe Counterpart Application", issued on Aug. 1, 2025, p. 1-p. 9.

"Office Action of China Counterpart Application", issued on Jul. 19, 2025, p. 1-p. 7.

"Office Action of Related U.S. Appl. No. 19/200,677", issued on Mar. 16, 2026, pp. 1-42.

"Search Report of Europe Related Application No. 25220937.4", issued on Jan. 30, 2026, pp. 1-9.

* cited by examiner

ILLUMINATION SYSTEM HAVING MULTIPLE LIGHT SOURCE MODULES AND PROJECTION DEVICE

CROSS-REFERENCE TO RELATED APPLICATION

This application claims the priority benefit of China application serial no. 202211445125.6, filed on Nov. 18, 2022. The entirety of the above-mentioned patent application is hereby incorporated by reference herein and made a part of this specification.

BACKGROUND

Technical Field

The disclosure relates to an optical system and an electronic device, and in particular relates to an illumination system and a projection device.

Description of Related Art

The projection device is a display device for producing large-scale images, and has been continuously improving with the evolution and innovation of technology. The imaging principle of the projection device is to convert the illumination beam generated by the illumination system into an image light beam through a light valve, and then project the image light beam to the projection target (such as a screen or a wall) through a projection lens to form a projection image.

In addition, the illumination system also follows the market requirements for the brightness, color saturation, service life, non-toxic and environmental protection of projection devices, etc., and has evolved from the ultra-high-performance lamp (UHP lamp) to the light-emitting diode (LED), and to the currently most advanced laser diode (LD) light source. However, in the current architecture, light sources of different colors are formed on different modules, and heat dissipation modules of different volumes or types are used to dissipate heat to improve light output efficiency. However, such an approach results in the volume of the illumination system to be too large, and it is not easy for the light beams of various colors to share the same optical path after light combining, which leads to uneven color of the projection image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an illumination system and a projection device, which may increase the brightness of the illumination system and improve the uniformity of the three colors in the illumination beam.

The other objectives and advantages of the disclosure may be further understood from the descriptive features disclosed in the disclosure.

In order to achieve one of, or portions of, or all of the above objectives or other objectives, the disclosure provides an illumination system for providing an illumination beam. The illumination system includes a first light source module, a second light source module, a third light source module, a first optical element, a second optical element, and a third optical element. The first light source module provides a first color light beam, a second color light beam, and a third color light beam. The second light source module provides a first color light beam, a second color light beam, and a third color light beam. The third light source module provides a third color light beam. The first optical element, the second optical element and the third optical element are all disposed on transmission paths of the first color light beam, the second color light beam and the third color light beam, and the first light source module and the second light source module are respectively located on opposite sides of the first optical element and the second optical element. The second optical element is located between the first optical element and the third optical element.

In order to achieve one of, or portions of, or all of the above objectives or other objectives, the disclosure further provides a projection device including an illumination system, a light valve, and a projection lens. The illumination system provides an illumination beam. The illumination system includes a first light source module, a second light source module, a third light source module, a first optical element, a second optical element, and a third optical element. The first light source module provides a first color light beam, a second color light beam, and a third color light beam. The second light source module provides a first color light beam, a second color light beam, and a third color light beam. The third light source module provides a third color light beam. The first optical element, the second optical element and the third optical element are disposed on transmission paths of the first color light beam, the second color light beam and the third color light beam, and the first light source module and the second light source module are respectively located on opposite sides of the first optical element and the second optical element. The second optical element is located between the first optical element and the third optical element. The light valve is disposed on the transmission path of the illumination beam to convert the illumination beam into an image light beam. The projection lens is disposed on the transmission path of the image light beam to project the image light beam out of the projection device.

In order to achieve one of, or portions of, or all of the above objectives or other objectives, the disclosure further provides an illumination system for providing an illumination beam. The illumination system includes a first light source module, a second light source module, a third light source module, a first optical element, a second optical element, a third optical element, and a converging element. The first light source module provides a first light beam, a second light beam, and a third light beam. The second light source module provides a fourth light beam, a fifth light beam, and a sixth light beam. The third light source module provides a seventh light beam. The first optical element is disposed on transmission paths of the first light beam, the second light beam and the third light beam, and the first optical element is used to allow the first light beam, the second light beam and the third light beam to pass through. The second optical element is disposed on transmission paths of the fifth light beam and the sixth light beam, and the second optical element is used to reflect a portion of the fifth light beam and allow another portion of the fifth light beam to pass through. The third optical element is disposed on the transmission path of the seventh light beam, and the third optical element is used to reflect the seventh light beam.

Based on the above, the embodiments of the disclosure have at least one of the following advantages or effects. In the illumination system and projection device of the disclosure, the first light source module provides a first color light beam, a second color light beam and a third color light beam, the second light source module provides a first color light beam, a second color light beam and a third color light beam, and the third light source module provides a third color light beam. The first color light beam, the second color light beam and the third color light beam are respectively and uniformly transmitted to different positions along different paths through the disposition of the first light source module, the second light source module, the third light source module, the first optical element, the second optical element, and the third optical element. Therefore, the multiple light spots formed by the first color light beam, the second color light beam, and the third color light beam may be evenly distributed and symmetrical. In addition, adding a third light source module to provide an additional third color light beam may further improve the brightness of the illumination system, and may provide uniform red, blue, and green light beams.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
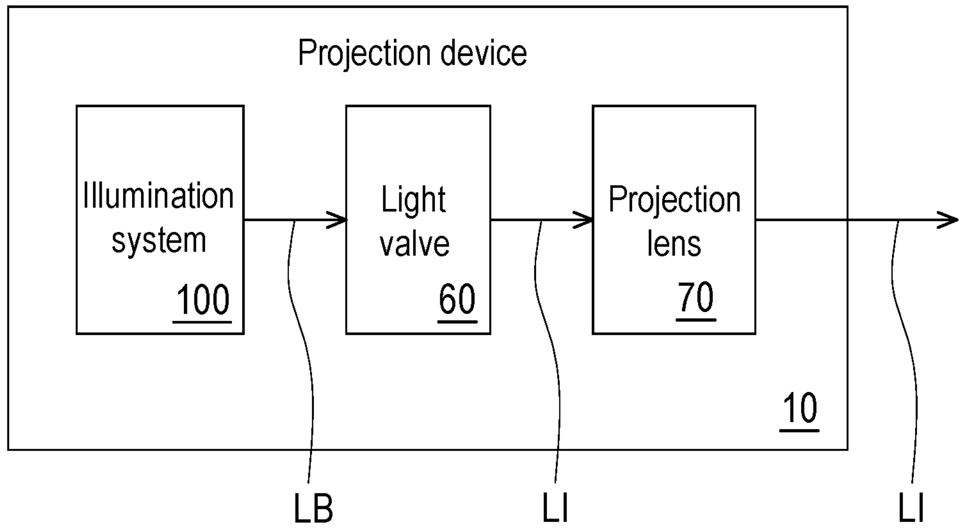
FIG. 1 is a schematic diagram of a projection device according to an embodiment of the disclosure.

FIG. 1 is a schematic diagram of a projection device according to an embodiment of the disclosure. Referring to FIG. 1, this embodiment provides a projection device 10 including an illumination system 100, a light valve 60, and a projection lens 70. The illumination system 100 is used to provide an illumination beam LB. The light valve 60 is disposed on the transmission path of the illumination beam LB to convert the illumination beam LB into an image light beam LI. The projection lens 70 is disposed on the transmission path of the image light beam LI, and is used to project the image light beam LI out of the projection device 10 to a projection target (not shown), such as a screen or a wall.

The illumination system 100 is used to provide an illumination beam LB. For example, in this embodiment, the illumination system 100 is formed of multiple light-emitting elements, a wavelength conversion element, a homogenizing element, a filter element, and multiple light-splitting elements to provide light with different wavelengths to form an image light beam LI. The light-emitting elements are, for example, light-emitting diodes (LEDs) or laser diodes (LDs). Detailed implementation are described in the following paragraphs.

The light valve 60 is, for example, a reflective light modulator such as a liquid crystal on silicon panel (LCoS panel) and a digital micro-mirror device (DMD). In some embodiments, the light valve 60 may also be a transmissive optical modulator, such as a transparent liquid crystal panel, an electro-optical modulator, a magneto-optical modulator, or an acousto-optic modulator (AOM), etc. The disclosure does not limit the form and type of the projection lens 60. The detailed process and implementation for the light valve 60 to convert the illumination beam LB into the image light beam LI may be obtained from general knowledge in the technical field with sufficient teaching, suggestion and implementation description, and therefore will not be repeated.

The projection lens 70 includes, for example, a combination of one or more optical lenses with diopter, such as various combinations of non-planar lenses such as biconcave lenses, biconvex lenses, meniscus lenses, convexconcave lenses, plano-convex lenses, and plano-concave lenses. In an embodiment, the projection lens 70 may further include a flat optical lens to project the image light beam LI from the light valve 60 to the projection target in a reflective manner. The disclosure does not limit the form and type of the projection lens 70.

Figure 2:
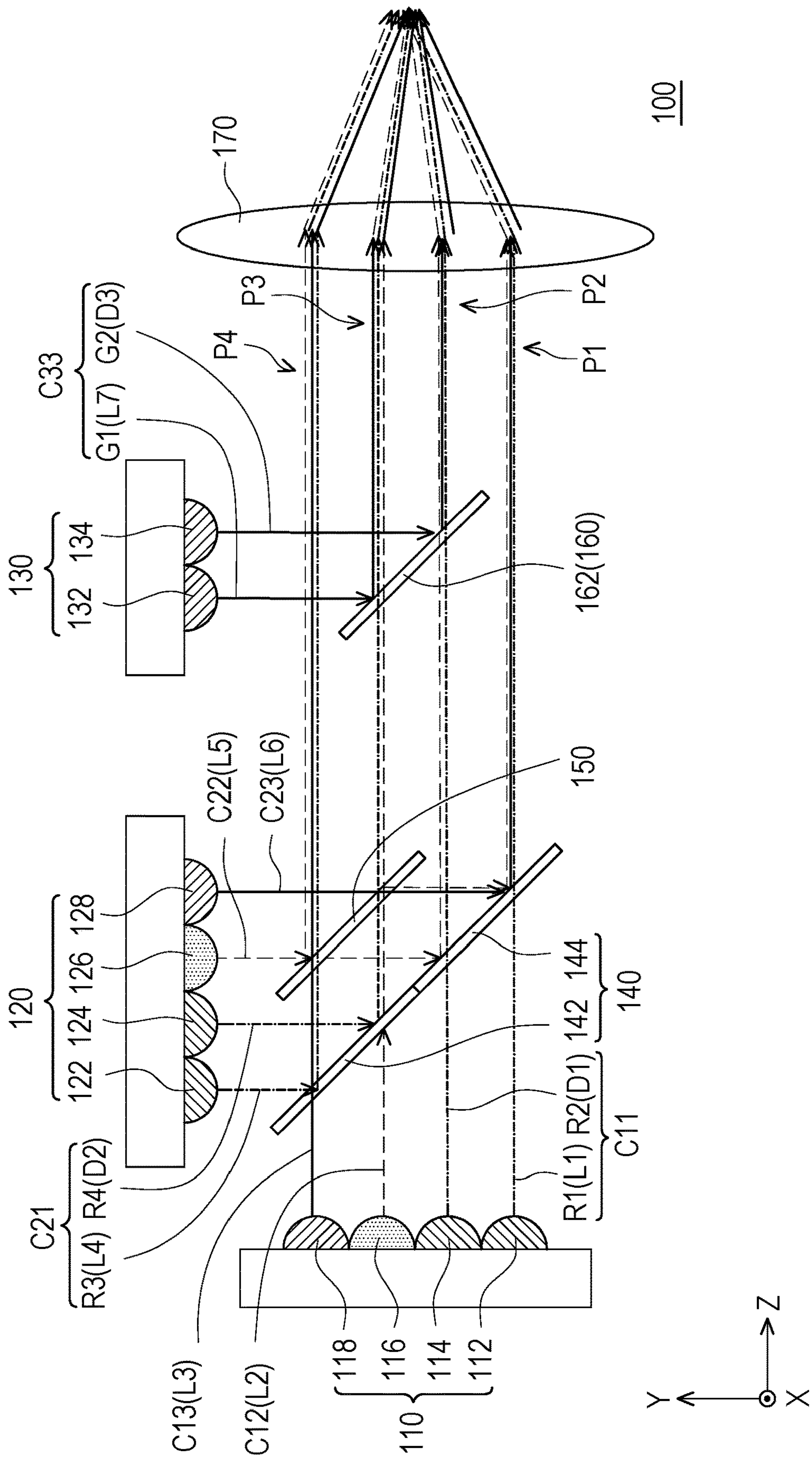
FIG. 2 is a schematic diagram of an illumination system according to an embodiment of the disclosure.

FIG. 2 is a schematic diagram of an illumination system according to an embodiment of the disclosure. The illumination system 100 shown in FIG. 2 may be applied to the projection device 10 shown in FIG. 1, so the following uses the projection device 10 shown in FIG. 1 as an example for description. Referring to FIG. 2, the illumination system 100 includes a first light source module 110, a second light source module 120, a third light source module 130, a first optical element 140, a second optical element 150, and a third optical element 160. In this embodiment, the illumination system 100 further includes a converging element 170, such as a focusing lens, disposed on the transmission paths of the light beams provided by all the first light source module 110, the second light source module 120, and the third light source module 130, so as to converge the light beams and provide them to subsequent optical elements, such as the homogenizing element (not shown).

In detail, the first light source module 110 provides a first color light beam C11, a second color light beam C12, and a third color light beam C13. The second light source module 120 provides a first color light beam C21, a second color light beam C22, and a third color light beam C23. The third light source module 130 provides a third color light beam C33. The converging element 170 is disposed on the transmission paths of the first color light beams C11 and C21, the second color light beams C12 and C22, and the third color light beams C13, C23, and C33. For example, in this embodiment, the first color light beams C11 and C21 are red light beams, the second color light beams C12 and C22 are blue light beams, and the third color light beams C13, C23, and C33 are green light beams. Therefore, it may be further defined that the first color light beam C11 provided by the first light source module 110 further includes the first red light beam R1 and the second red light beam R2, and the first color light beam C21 provided by the second light source module 120 further includes a third red light beam R3 and a fourth red light beam R4. On the other hand, the third color light beam C33 provided by the third light source module 130 further includes a first green light beam G1 and a second green light beam G2. In this embodiment, the first color light beams C11 and C21 are of the same color, the second color light beams C12 and C22 are of the same color, and the third color light beams C13, C23, and C33 are of the same color. However, in different embodiments, light beams of the same color may have a slight difference in wavelength range (e.g., the wavelength of the first red light beam R1 is 625 nm, and the wavelength of the second red light beam R2 is 610 nm), the disclosure is not limited thereto.

Alternatively, in another embodiment, the first red light beam R1 provided by the first light source module 110 may be referred to as the first light beam L1, the second color light beam C12 may be referred to as the second light beam L2, and the third color light beam C13 may be referred to as the third light beam L3. The third red light beam R3 provided by the second light source module 120 may be referred to as the fourth light beam L4, the second color light beam C22 may be referred to as the fifth light beam L5, and the third color light beam C23 may be referred to as the sixth light beam L6. The third color light beam C33 provided by the third light source module 130 may be referred to as the seventh light beam L7. In addition, the second red light beam R2 provided by the first light source module 110 may be referred to as the first adjusted light beam D1, the fourth red light beam R4 provided by the second light source module 120 may be referred to as the second adjusted light beam D2, and the second green light beam G2 provided by the third light source module 130 may be referred to as the third adjusted light beam. D3.

In this embodiment, the extending direction of the substrate of the first light source module 110 and the extending direction of the substrate of the second light source module 120 are perpendicular to each other, and the extending direction of the substrate of the second light source module 120 is parallel to the extending direction of the substrate of the third light source module 130. However, in other embodiments, the extending direction of the substrate of the second light source module 120 and the extending direction of the substrate of the third light source module 130 may be configured to be non-parallel, and the disclosure is not limited thereto. It is worth mentioning that the first red light beam R1, the second red light beam R2, the second color light beam C12, and the third color light beam C13 provided by the first light source module 110 are linearly arranged, the third red light beam R3, the fourth red light beam R4, the second color light beam C22, and the third color light beam C23 provided by the second light source module 120 are linearly arranged, and the first green light beam G1 and the second green light beam G2 provided by the third light source module 130 are linearly arranged. In other words, the first light source module 110 includes at least one first red laser diode 112, at least one second red laser diode 114, at least one blue laser diode 116, and at least one green laser diode 118 that are linearly arranged. The second light source module 120 includes at least one first red laser diode 122, at least one second red laser diode 124, at least one blue laser diode 126, and at least one green laser diode 128 that are linearly arranged. Taking the description of the beam placement shown in FIG. 3 as an example, in this embodiment, the number of the first red laser diode 112, the second red laser diode 114, the blue laser diode 116, and the green laser diode 118 in the first light source module 110 is four respectively, the number of the first red laser diode 122, the second red laser diode 124, the blue laser diode 126, and the green laser diode 128 in the second light source module 120 is also four respectively, and the number of the first green laser diodes 132 and the second green laser diodes 134 in the third light source module 130 is also four respectively. However, in different embodiments, the number of laser diodes with the same color light may be any positive integer number, and the disclosure is not limited thereto.

The first optical element 140, the second optical element 150, and the third optical element 160 are all disposed on the transmission paths of the first color light beams C11 and C21, the second color light beams C12 and C22, and the third color light beams C13, C23, and C33. The first light source module 110 and the second light source module 120 are respectively located on the opposite sides of the first optical element 140 and the second optical element 150, and the third optical element 160 is located between the converging element 170 and the second optical element 150. The second optical element 150 is located between the first optical element 140 and the third optical element 160. Therefore, by disposing the first optical element 140, the second optical element 150 and the third optical element 160, the first color beams C11 and C21, the second color beams C12 and C22, and the third color beams C13, C23, and C33 may be combined to obtain an illumination beam with uniform color distribution (as seen in FIG. 1).

In detail, the first optical element 140 includes a first region 142 and a second region 144. The first region 142 is used to reflect the first color light beam C21 and allow the second color light beam C12 and the third color light beam C13 to pass through. The second region 144 is used to allow the first color light beam C11 to pass through and reflect the second color light beam C22 and the third color light beam C23. For example, the first region 142 of the first optical element 140 is, for example, a dichroic mirror with red reflect (DMR), which is used to reflect red light and allow blue light and green light to pass through. The second region 144 of the first optical element 140 is, for example, a dichroic mirror with blue and green reflect (DMBG), which is used to reflect blue light and green light and allow red light to pass through.

The second optical element 150 is, for example, a half mirror with blue (HMB), which is used to reflect a portion of the second color light beams C12 and C22, and allow the other portion of the second color light beams C12 and C22 to pass through. In this embodiment, the second optical element 150 reflects 50% of the second color light beams C12 and C22 and allows 50% of the second color light beams C12 and C22 to pass through. In addition, the second optical element 150 is fully transmissive to red light and green light. The third optical element 160 includes an optical region 162, for example, a dichroic mirror with green reflect (DMG), which is used to reflect the third color light beam C33, and allow the first color light beams C11 and C21 and the second color light beam C12 and C22 to pass through.

Therefore, regarding the paths of the light beams, the first color light beams C11 and C21, the second color light beams C12 and C22, and the third color light beams C13, C23, and C33 are respectively and uniformly transmitted to different positions of the converging element 170 along the first path P1, the second path P2, the third path P3, and the fourth path P4 through the disposition of the first light source module 110, the second light source module 120, the third light source module 130, the first optical element 140, the second optical element 150, and the third optical element 160. The first path P1 to the fourth path P4 are parallel to each other and do not overlap.

Specifically, in this embodiment, the first red light beam R1 (i.e., the first light beam L1) provided by the first light source module 110 is transmitted from the first light source module 110 through the second region 144 of the first optical element 140, and transmitted to the converging element 170 along the first path P1. The second red light beam R2 provided by the first light source module 110 (i.e., the first adjusted light beam D1) is transmitted from the first light source module 110 through the second region 144 of the first optical element 140 and through the optical region 162 of the third optical element 160 along the second path P2 to be transmitted to the converging element 170. The second color light beam C12 (i.e., the second light beam L2) provided by the first light source module 110 is transmitted from the first light source module 110 through the first region 142 of the first optical element 140 and transmitted to the second optical element 150 along the third path P3 to generate a half reflection to form a first portion and a second portion. The first portion of the second color light beam C12 passes through the second optical element 150 and continues to be transmitted through the optical region 162 of the third optical element 160 along the third path P3 to be transmitted to the converging element 170. The second portion of the second color light beam C12 is reflected by the second optical element 150 to the second region 144 of the first optical element 140, and is transmitted to the converging element 170 along the first path P1 by being reflected by the second region 144. The third color light beam C13 (i.e., the third light beam L3) provided by the first light source module 110 is transmitted from the first light source module 110 through the first region 142 of the first optical element 140, and sequentially transmitted to the second optical element 150 and the converging element 170 along the fourth path P4.

In addition, the third red light beam R3 (i.e., the fourth light beam LA) provided by the second light source module 120 is transmitted from the second light source module 120 to the first region 142 of the first optical element 140, and sequentially transmitted along the fourth path P4 by being reflected by the first region 142 to the second optical element 150 and the converging element 170. The fourth red light beam R4 provided by the second light source module 120 (i.e., the second adjusted light beam D2) is transmitted from the second light source module 120 to the first region 142 of the first optical element 140, reflected from the first region 142 and transmitted to the second optical element 150 along the third path P3, and transmitted to pass through the optical region 162 of the third optical element 160 to be transmitted to the converging element 170. The second color light beam C22 (i.e., the fifth light beam L5) provided by the second light source module 120 is transmitted from the second light source module 120 to the second optical element 150 to generate a half reflection, in which a portion of the second color light beam C22 is reflected by the second optical element 150 and transmitted to the converging element 170 along the fourth path P4. The other portion of the second color light beam C22 passes through the second optical element 150 and is transmitted to the second region 144 of the first optical element 140, reflected by the second region 144 and transmitted to pass through the optical region 162 of the third optical element 160 along the second path P2 to be transmitted to the converging element 170. The third color light beam C23 (i.e., the sixth light beam L6) provided by the second light source module 120 is transmitted from the second light source module 120 through the second optical element 150 to the second region 144 of the first optical element 140, reflected by the second region 144, and transmitted to the converging element 170 along the first path P1.

In addition, the first green light beam G1 (i.e., the seventh light beam L7) provided by the third light source module 130 is transmitted from the third light source module 130 to the optical region 162 of the third optical element 160, reflected by the optical region 162, and transmitted to the converging element 170 along the third path P3. The second green light beam G2 (i.e., the third adjusted light beam D3) provided by the third light source module 130 is transmitted from the third light source module 130 to the optical region 162 of the third optical element 160, reflected by the optical region 162, and transmitted to the converging element 170 along the second path P2.

Figure 3:
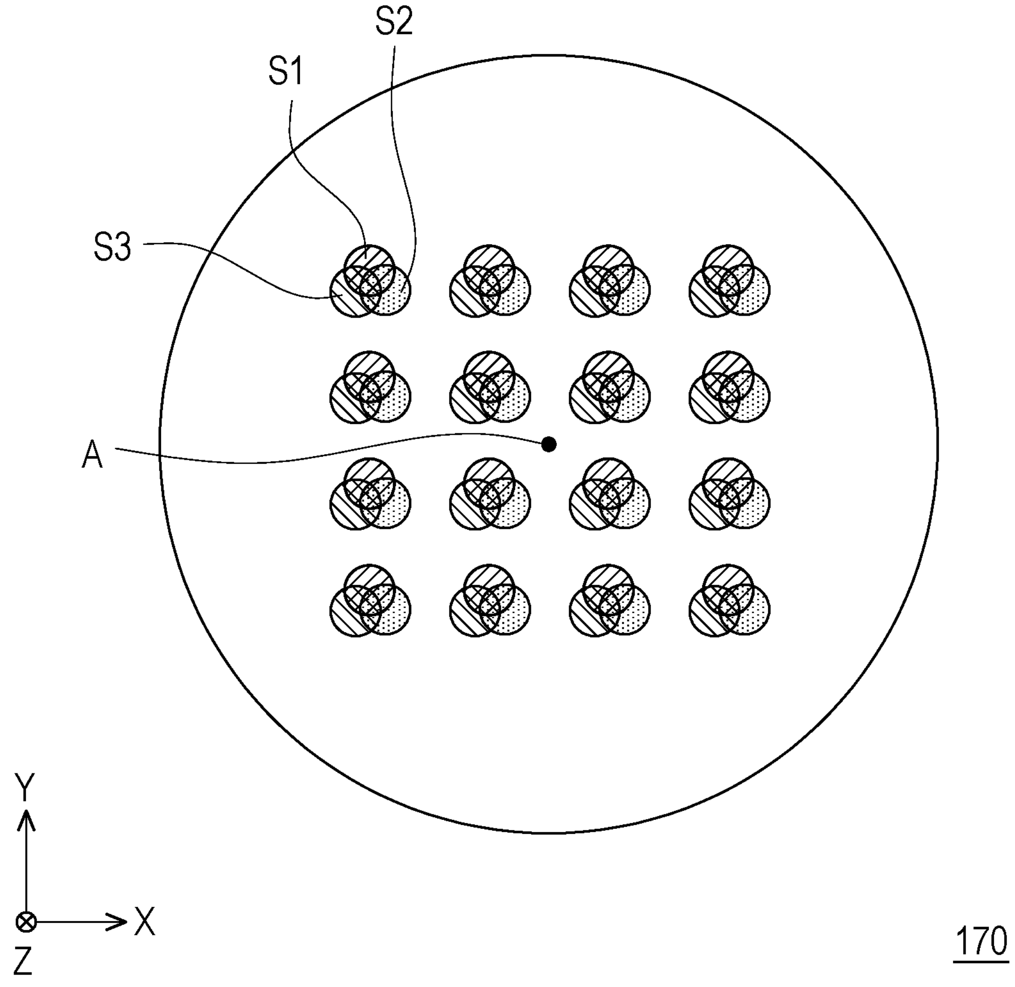
FIG. 3 is a schematic diagram of the converging element in the illumination system of FIG. 2.

FIG. 3 is a schematic diagram of the converging element in the illumination system of FIG. 2. Referring to FIG. 1 to FIG. 3, since the first color light beams C11 and C21, the second color light beams C12 and C22, and the third color light beams C13, C23, and C33 are respectively and uniformly transmitted to different positions of the converging element 170 along the first path P1, the second path P2, the third path P3, and the fourth path P4, the first color light beams C11 and C21, the second color light beams C12 and C22, and the third color light beams C13, C23, and C33 may respectively form multiple light spots S1, S2, and S3 on the converging element 170, and the light spots S1, S2, and S3 are symmetrical to each other with respect to the center A of the converging element 170. Specifically, the light spots S1, S2, and S3 are transmitted to different positions along the first path P1 to the fourth path P4 and overlap each other. It is worth mentioning that in this embodiment, since the third light source module 130 is added to provide the first green light beam G1 and the second green light beam G2, the brightness of the illumination system 100 may be further improved, and each path P1 to P4 all have red, blue, and green lights, providing an illumination beam LB with uniform red, blue, and green colors, in which the illumination beam LB has at least one of red light, blue light, and green light.

Figure 4:
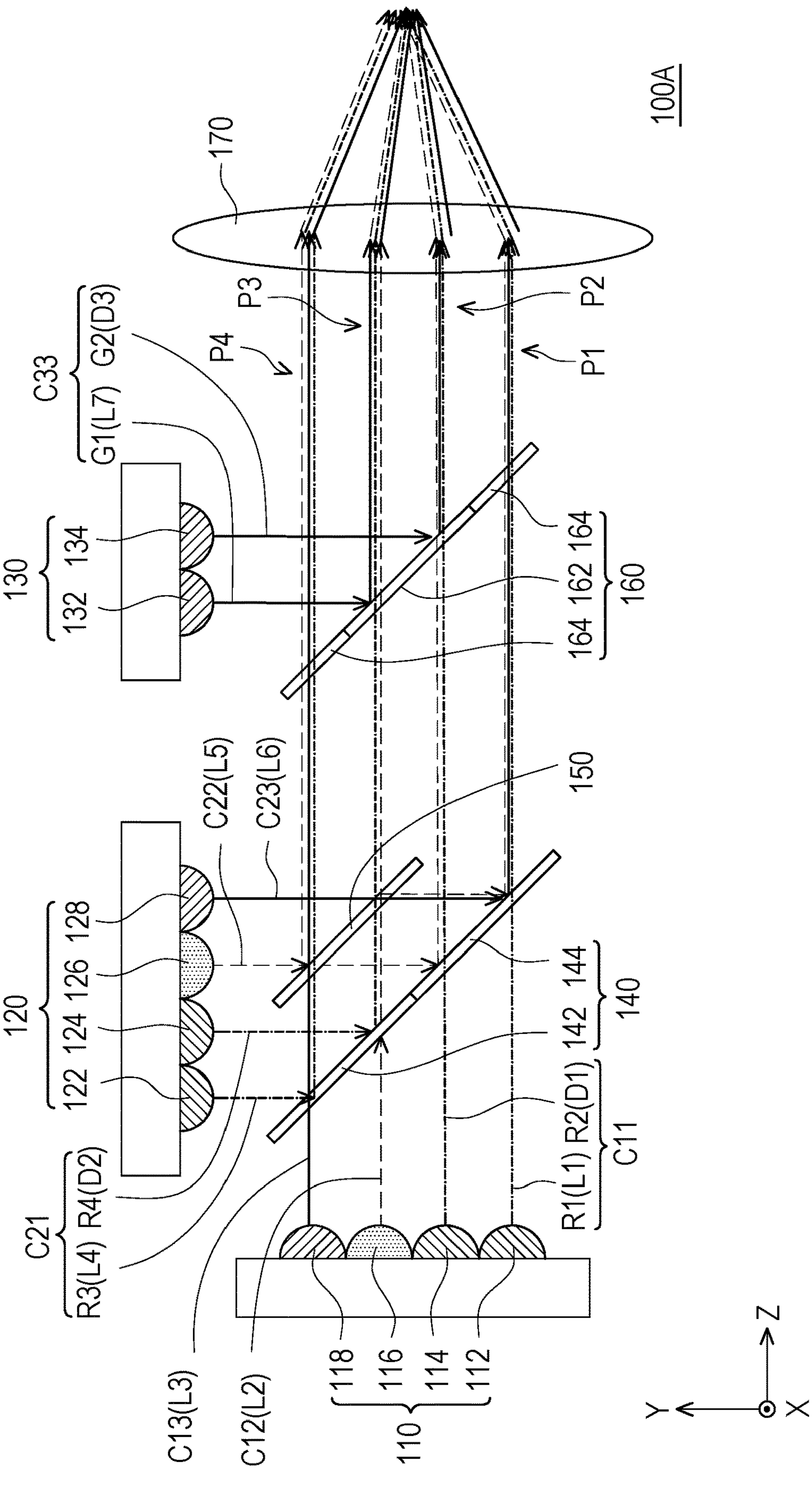
FIG. 4 is a schematic diagram of an illumination system according to another embodiment of the disclosure.

FIG. 4 is a schematic diagram of an illumination system according to another embodiment of the disclosure. Referring to FIG. 4, an illumination system 100A of this embodiment is similar to the illumination system 100 shown in FIG. 2. The difference between the two is that in this embodiment, the third optical element 160 further includes two transmissive regions 164, and the optical region 162 is connected between the two transmissive regions 164. The two transmissive regions 164 are, for example, light-transmissive glass for allowing light beams to pass through. Specifically, the length of the third optical element 160 may correspond to the extension length of the first optical element 140. For example, in this embodiment, the covered area of the third optical element 160 extended by the two transmissive regions 164 is the same as the covered area of the first optical element 140. Therefore, all light beams transmitted along the first path P1 and the fourth path P4 may pass through the third optical element 160. In this way, light beams transmitted along the first path P1 and the fourth path P4 may be prevented from being deflected due to being incident on the edge of the optical region 162, thereby reducing brightness loss and improving the brightness of the illumination system 100A.

Figure 5:
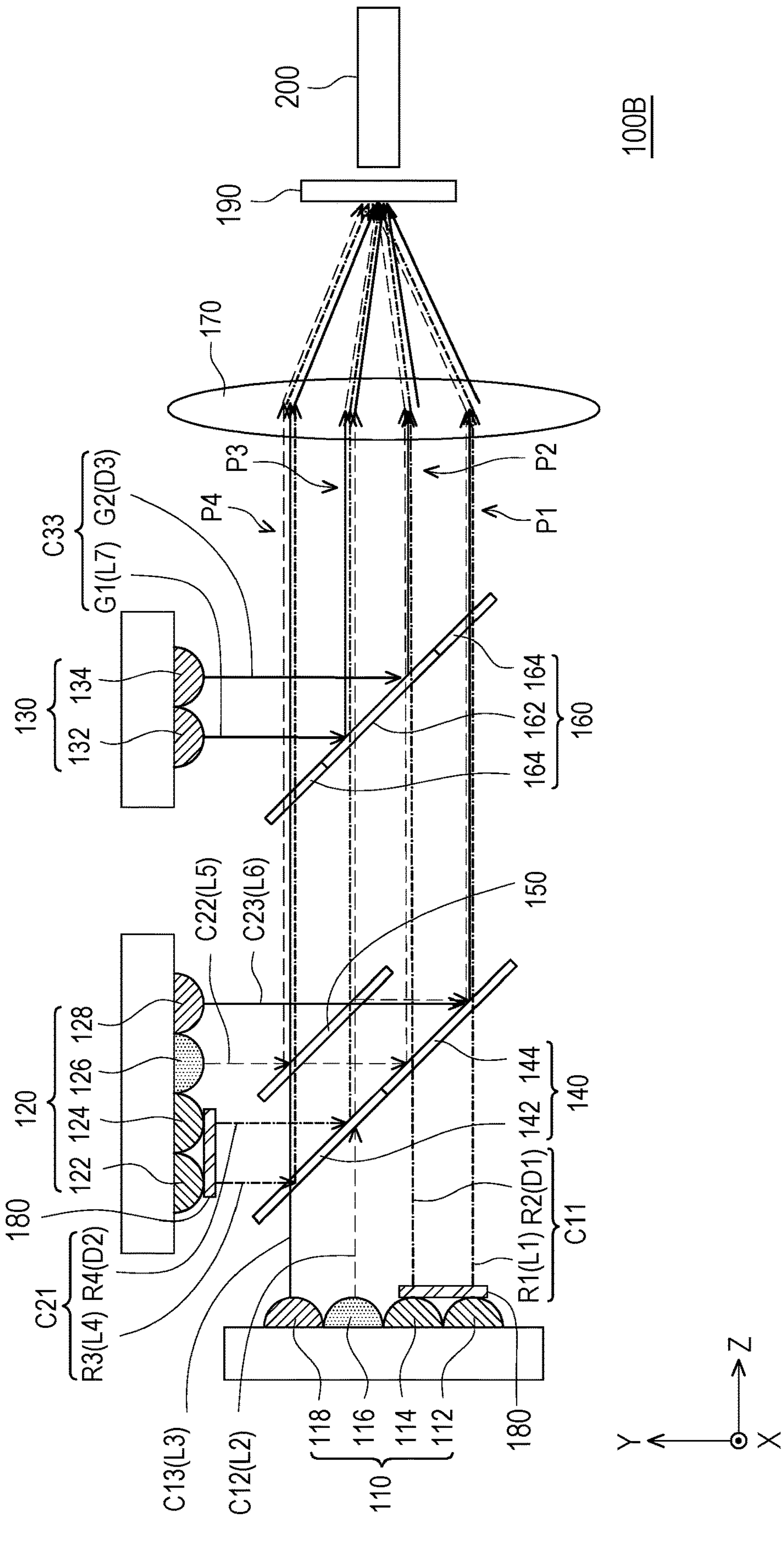
FIG. 5 is a schematic diagram of an illumination system according to another embodiment of the disclosure.

FIG. 5 is a schematic diagram of an illumination system according to another embodiment of the disclosure. Referring to FIG. 5, an illumination system 100B of this embodiment is similar to the illumination system 100 shown in FIG. 2 and the illumination system 100A shown in FIG. 4. The difference is that in this embodiment, the illumination system 100B further includes a polarizing element 180, a diffusing device 190 and a homogenizing element 200. In other embodiments, the polarizing element 180, the diffusing device 190 and the homogenizing element 200 may be applied to the illumination system 10 shown in FIG. 2.

In this embodiments, the illumination system 100B includes a first light source module 110, a second light source module 120, a third light source module 130, a first optical element 140, a second optical element 150, and a third optical element 160. In this embodiment, the illumination system 100B further includes a polarizing element 180, a diffusing device 190 and a homogenizing element 200. The converging element 170, such as a focusing lens, disposed on the transmission paths of at least one light beam provided by all the first light source module 110, the second light source module 120, and the third light source module 130, so as to converge the light beams and provide them to the diffusing device 190 and the homogenizing element 200. The diffusing device 190 is disposed on the transmission paths of at least one light beam provided by the first light source module 110, the second light source module 120 and the third light source module 130 for diffusing the light beam. The diffusing device 190 is, for example, a diffuser or a diffuser wheel with diffusing sheets, and the disclosure is not limited thereto. On the transmission path of at least one light beam provided by the first light source module 110, the second light source module 120 and the third light source module 130, the diffusion device 190 is disposed between the converging element 170 and the homogenizing element 200.

The homogenizing element 200 is adapted to form at least one light beam provided by the first light source module 110, the second light source module 120 and the third light source module 130 into an illumination beam LB. The homogenizing element 200 is used to adjust the light spot shape of the light beam, so that the light spot shape of the illumination beam LB can match the shape of the working area of the light valve 60 (i.e., a rectangle), and that the light spot has the same or close light intensity everywhere, such that the light intensity of the illumination beam LB is homogeneous. In this embodiment, the homogenizing element 200 is, for example, an integration rod, but in other embodiments, the homogenizing element 200 may also be an optical element of other suitable forms, such as a lens array (fly eye lens array), the disclosure is not limited thereto.

In detail, the first light source module 110 provides a first color light beam C11, a second color light beam C12, and a third color light beam C13. The second light source module 120 provides a first color light beam C21, a second color light beam C22, and a third color light beam C23. The third light source module 130 provides a third color light beam C33. The converging element 170 is disposed on the transmission paths of the first color light beams C11 and C21, the second color light beams C12 and C22, and the third color light beams C13, C23, and C33. For example, in this embodiment, the first color light beams C11 and C21 are red light beams, the second color light beams C12 and C22 are blue light beams, and the third color light beams C13, C23, and C33 are green light beams. Therefore, it may be further defined that the first color light beam C11 provided by the first light source module 110 further includes the first red light beam R1 and the second red light beam R2, and the first color light beam C21 provided by the second light source module 120 further includes a third red light beam R3 and a fourth red light beam R4.

On the other hand, the third color light beam C33 provided by the third light source module 130 further includes a first green light beam G1 and a second green light beam G2. In this embodiment, the first color light beams C11 and C21 are of the same color, the second color light beams C12 and C22 are of the same color, and the third color light beams C13, C23, and C33 are of the same color. However, in different embodiments, light beams of the same color may have a slight difference in wavelength range (e.g., the wavelength of the first red light beam R1 is 625 nm, and the wavelength of the second red light beam R2 is 610 nm), the disclosure is not limited thereto.

In another embodiment, the first red light beam R1 provided by the first light source module 110 may be referred to as the first light beam L1, the second color light beam C12 may be referred to as the second light beam L2, and the third color light beam C13 may be referred to as the third light beam L3. The third red light beam R3 provided by the second light source module 120 may be referred to as the fourth light beam L4, the second color light beam C22 may be referred to as the fifth light beam L5, and the third color light beam C23 may be referred to as the sixth light beam L6. The third color light beam C33 provided by the third light source module 130 may be referred to as the seventh light beam L7. In addition, the second red light beam R2 provided by the first light source module 110 may be referred to as the first adjusted light beam D1, the fourth red light beam R4 provided by the second light source module 120 may be referred to as the second adjusted light beam D2, and the second green light beam G2 provided by the third light source module 130 may be referred to as the third adjusted light beam. In this embodiment, the extending direction of the substrate of the first light source module 110 and the extending direction of the substrate of the second light source module 120 are perpendicular to each other, and the extending direction of the substrate of the second light source module 120 is parallel to the extending direction of the substrate of the third light source module 130. However, in other embodiments, the extending direction of the substrate of the second light source module 120 and the extending direction of the substrate of the third light source module 130 may be configured to be non-parallel, and the disclosure is not limited thereto. It is worth mentioning that the first red light beam R1, the second red light beam R2, the second color light beam C12, and the third color light beam C13 provided by the first light source module 110 are linearly arranged, the third red light beam R3, the fourth red light beam R4, the second color light beam C22, and the third color light beam C23 provided by the second light source module 120 are linearly arranged, and the first green light beam G1 and the second green light beam G2 provided by the third light source module 130 are linearly arranged. In other words, the first light source module 110 includes at least one first red laser diode 112, at least one second red laser diode 114, at least one blue laser diode 116, and at least one green laser diode 118 that are linearly arranged. The second light source module 120 includes at least one first red laser diode 122, at least one second red laser diode 124, at least one blue laser diode 126, and at least one green laser diode 128 that are linearly arranged.

In addition, on the transmission path of the first red light beam R1 (first light beam L1) and the second red light beam R2 (first adjusted light beam D1), the polarizing element 180 is disposed between the at least one first red laser diode 112 and at least one second red laser diode 114 of the first light source module 110 and the first optical element 140. And, on the transmission path of the third red light beam R3 (fourth light beam L4) and the fourth red light beam R4 (second adjusted light beam D2), another polarizing element 180 is disposed between the at least one first red laser diode 122 and the at least one second red laser diode 124 of the second light source module 120 and the first optical element 140. The polarizing element 180 is used to change the polarization state of the light beam. In this embodiment, the polarizing element 180 includes, for example, a half-wave plate. The polarizing element 180 is illustrated as an example disposed on the transmission paths of the first red light beam R1 and the second red light beam R2. The second color light beam C12 and the third color light beam C13 do not pass through the polarizing element 180. After the first red light beam R1 and the second red light beam R2 pass through the polarizing element 180, the first red light beam R1 with P-polarization and the second red light beam R2 with P-polarization will pass through the polarizing element 180 and be transformed into the first red light beam R1 with S-polarization and a second red light beam R2 with S-polarization. In other words, the first red light beam R1 and the second red light beam R2 pass through the polarizing element 180 so that the polarization states of the first red light beam R1 and the second red light beam R2 are changed to be the same as those of the second color light beam C12 and the third color light beam C13. Still in other words, the polarization states of the first red light beam R1, the second red light beam R2, the second color light beam C12 and the third color light beam C13 are all the same (that is, S-polarization) when they enter the homogenizing element 200. In this way, the polarization states of all light beams can be unified to improve color uniformity.

In addition, it is worth mentioning that the conversion of the light beam with P-polarized into the light beam with S-polarized in this embodiment has advantages compared with the conversion of the light beam with S-polarized into the light beam with P-polarized. In detail, the half-wave plate in the polarizing element 180 has a certain degree of absorption for the light beam. Since the main brightness in the illumination system 100 is provided by the third color light beam C13 as green light, so if the polarizing element 180 is used to transform the polarization states of the first red light beam R1 and the second red light beam R2 to avoid transforming the third color light beam C13 and will make the illumination system 100B have better brightness and maintain a good optical effect. In another embodiment, the polarizing element 180 may be a twisted nematic liquid crystal device instead of a half-wave plate, so as to transform the first red light beam R1 with P-polarized and the second red light beam R2 with P-polarized into the first red light beam R1 with S-polarized and the second red light beam R2 with S-polarized, to achieve the same effect, the disclosure is not limited thereto.

To sum up, in the illumination system and projection device of the disclosure, the first light source module provides a first color light beam, a second color light beam and a third color light beam, the second light source module provides a first color light beam, a second color light beam and a third color light beam, and the third light source module provides a third color light beam. The first color light beam, the second color light beam and the third color light beam are respectively and uniformly transmitted to different positions along different paths through the disposition of the first light source module, the second light source module, the third light source module, the first optical element, the second optical element, and the third optical element. Therefore, the multiple light spots formed by the first color light beam, the second color light beam, and the third color light beam may be evenly distributed and symmetrical. In addition, adding a third light source module to provide an additional third color light beam may further improve the brightness of the illumination system. Moreover, each path from the first path to the fourth path may have red, blue, and green lights, so as to provide uniform red, blue, and green illumination beams.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An illumination system, providing an illumination beam, the illumination system comprising a first light source module, a second light source module, a third light source module, a first optical element, a second optical element, and a third optical element, wherein:

- the first light source module is configured to provide a first color light beam, a second color light beam, and a third color light beam;
- the second light source module is configured to provide the first color light beam, the second color light beam, and the third color light beam;
- the third light source module is configured to provide the third color light beam;
- the first optical element, the second optical element and the third optical element are all disposed on transmission paths of the first color light beam, the second color light beam and the third color light beam, and the first light source module and the second light source module are respectively located on opposite sides of the first optical element and the second optical element, the second optical element is located between the first optical element and the third optical element;
- the second optical element is configured to reflect a portion of the second color light beam, and allow another portion of the second color light beam, the first color light beam and the third color light beam to pass through; and
- the third optical element is configured to reflect the third color light beam, and allow the first color light beam and the second color light beam to pass through.

2. The illumination system according to claim 1, wherein an extending direction of a substrate of the first light source module and an extending direction of a substrate of the second light source module are perpendicular to each other, and the extending direction of the substrate of the second light source module is parallel to an extending direction of a substrate of the third light source module.

3. The illumination system according to claim 1, wherein the first light source module comprises at least one first red laser diode, at least one second red laser diode, at least one blue laser diode, and at least one green laser diode that are linearly arranged, the second light source module comprises at least one first red laser diode, at least one second red laser diode, at least one blue laser diode, and at least one green laser diode that are linearly arranged.

4. The illumination system according to claim 3, wherein the illumination system further comprises a first polarizing element and a second polarizing element, the first polarizing element is disposed between the at least one first red laser diode and the at least one second red laser diode of the first light source module and the first optical element, the second polarizing element is disposed between the at least one first red laser diode and the at least one second red laser diode of the second light source module and the first optical element.

5. The illumination system according to claim 1, wherein the first optical element comprises a first region and a second region, the first region is configured to reflect the first color light beam and allow the second color light beam and the third color light beam to pass through, the second region is configured to allow the first color light beam to pass through and reflect the second color light beam and the third color light beam.

6. The illumination system according to claim 1, wherein the third optical element comprises an optical region for reflecting the third color light beam and allowing the first color light beam and the second color light beam to pass through.

7. The illumination system according to claim 1, wherein the third optical element further comprises two transmissive regions, the optical region is connected between the two transmissive regions, and the two transmissive regions are configured to allow light beams to pass through.

8. The illumination system according to claim 1, wherein the illumination system further comprises a converging element, the converging element is disposed on the transmission paths of the first color light beam, the second color light beam, and the third color light beam, and the third optical element is located between the converging element and the second optical element, wherein the first color light beam, the second color light beam, and the third color light beam form a plurality of light spots on the converging element, and the plurality of light spots are symmetrical to each other with respect to a center of the converging element.

9. The illumination system according to claim 8, wherein the first color light beam provided by the first light source module further comprises a first red light beam and a second red light beam, the first red light beam is transmitted to the first optical element and transmitted to the converging element along a first path, the second red light beam is transmitted to the first optical element and transmitted to the third optical element and the converging element along a second path, the first color light beam provided by the second light source module further comprises a third red light beam and a fourth red light beam, the third red light beam is transmitted to the first optical element, and is sequentially transmitted to the second optical element and the converging element along a fourth path by being reflected by the first optical element, the fourth red light beam is transmitted to the first optical element, and is sequentially transmitted to the second optical element, the third optical element, and the converging element along a third path by being reflected by the first optical element.

10. The illumination system according to claim 9, wherein the first path to the fourth path are parallel to each other and do not overlap.

11. The illumination system according to claim 9, wherein the second color light beam provided by the first light source module is sequentially transmitted to the first optical element and the second optical element, and through the second optical element, the second color light beam is divided into a first portion of the second color light beam and a second portion of the second color light beam, the first portion of the second color light beam is sequentially transmitted to the third optical element and the converging element along the third path, and the second portion of the second color light beam is reflected by the first optical element and transmitted to the converging element along the first path, and the second color light beam provided by the second light source module is transmitted to the second optical element, through the second optical element, the second color light beam is divided into a third portion of the second color light beam and a fourth portion of the second color light beam, the third portion of the second color light beam is transmitted to the converging element along the fourth path, and the fourth portion of the second color light beam is reflected by the first optical element and sequentially transmitted to the third optical element and the converging element along the second path.

12. The illumination system according to claim 11, wherein the third color light beam provided by the first light source module is sequentially transmitted to the first optical element and the second optical element, and is transmitted to the converging element along the fourth path, the third color light beam provided by the second light source module is sequentially transmitted to the second optical element and the first optical element, and transmitted to the converging element along the first path by being reflected by the first optical element.

13. The illumination system according to claim 12, wherein the third color light beam provided by the third light source module further comprises a first green light beam and a second green light beam, and by being reflected by the third optical element, the first green light beam is transmitted to the converging element along the third path, and the second green light beam is transmitted to the converging element along the second path.

14. A projection device, comprising an illumination system, a light valve, and a projection lens, wherein:

the illumination system provides an illumination beam, the illumination system comprises a first light source module, a second light source module, a third light source module, a first optical element, a second optical element, and a third optical element, wherein:

the first light source module is configured to provide a first color light beam, a second color light beam, and a third color light beam;

the second light source module is configured to provide the first color light beam, the second color light beam, and the third color light beam;

the third light source module is configured to provide the third color light beam;

the first optical element, the second optical element and the third optical element are disposed on transmission paths of the first color light beam, the second color light beam and the third color light beam, and the first light source module and the second light source module are respectively located on opposite sides of the first optical element and the second optical element, the second optical element is located between the first optical element and the third optical element;

the second optical element is configured to reflect a portion of the second color light beam, and allow another portion of the second color light beam, the first color light beam and the third color light beam to pass through; and the third optical element is configured to reflect the third color light beam, and allow the first color light beam and the second color light beam to pass through;

the light valve is disposed on a transmission path of the illumination beam to convert the illumination beam into an image light beam; and the projection lens is disposed on a transmission path of the image light beam to project the image light beam out of the projection device.

15. The projection device according to claim 14, wherein an extending direction of a substrate of the first light source module and an extending direction of a substrate of the second light source module are perpendicular to each other, and the extending direction of the substrate of the second light source module is parallel to an extending direction of a substrate of the third light source module.

16. The projection device according to claim 14, wherein the first light source module comprises at least one first red laser diode, at least one second red laser diode, at least one blue laser diode, and at least one green laser diode that are linearly arranged, the second light source module comprises at least one first red laser diode, at least one second red laser diode, at least one blue laser diode, and at least one green laser diode that are linearly arranged.

17. The projection device according to claim 16, wherein the illumination system further comprises a first polarizing element and a second polarizing element, the first polarizing element is disposed between the at least one first red laser diode and the at least one second red laser diode of the first light source module and the first optical element, the second polarizing element is disposed between the at least one first red laser diode and the at least one second red laser diode of the second light source module and the first optical element.

18. The projection device according to claim 14, wherein the first optical element comprises a first region and a second region, the first region is configured to reflect the first color light beam and allow the second color light beam and the third color light beam to pass through, the second region is configured to allow the first color light beam to pass through and reflect the second color light beam and the third color light beam.

19. The projection device according to claim 14, wherein the third optical element comprises an optical region for reflecting the third color light beam and allowing the first color light beam and the second color light beam to pass through.

20. The projection device according to claim 19, wherein the third optical element further comprises two transmissive regions, the optical region is connected between the two transmissive regions, and the two transmissive regions are configured to allow light beams to pass through.

21. The projection device according to claim 14, wherein the illumination system further comprises a converging element, the converging element is disposed on the transmission paths of the first color light beam, the second color light beam, and the third color light beam, and the third optical element is located between the converging element and the second optical element, wherein the first color light beam, the second color light beam, and the third color light beam form a plurality of light spots on the converging element, and the plurality of light spots are symmetrical to each other with respect to a center of the converging element.

22. The projection device according to claim 21, wherein the first color light beam provided by the first light source module further comprises a first red light beam and a second red light beam, the first red light beam is transmitted to the first optical element and transmitted to the converging element along a first path, the second red light beam is transmitted to the first optical element and transmitted to the third optical element and the converging element along a second path, the first color light beam provided by the second light source module further comprises a third red light beam and a fourth red light beam, the third red light beam is transmitted to the first optical element, and is sequentially transmitted to the second optical element and the converging element along a fourth path by being reflected by the first optical element, the fourth red light beam is transmitted to the first optical element, and is sequentially transmitted to the second optical element, the third optical element, and the converging element along a third path by being reflected by the first optical element.

23. The projection device according to claim 22, wherein the first path to the fourth path are parallel to each other and do not overlap.

24. The projection device according to claim 22, wherein the second color light beam provided by the first light source module is sequentially transmitted to the first optical element and the second optical element, and through the second optical element, the second color light beam is divided into a first portion of the second color light beam and a second portion of the second color light beam, the first portion of the second color light beam is sequentially transmitted to the third optical element and the converging element along the third path, and the second portion of the second color light beam is reflected by the first optical element and transmitted to the converging element along the first path, and the second color light beam provided by the second light source module is transmitted to the second optical element, through the second optical element, the second color light beam is divided into a third portion of the second color light beam and a fourth portion of the second color light beam, the third portion of the second color light beam is transmitted to the converging element along the fourth path, and the fourth portion of the second color light beam is reflected by the first optical element and sequentially transmitted to the third optical element and the converging element along the second path.

25. The projection device according to claim 24, wherein the third color light beam provided by the first light source module is sequentially transmitted to the first optical element and the second optical element, and is transmitted to the converging element along the fourth path, the third color light beam provided by the second light source module is sequentially transmitted to the second optical element and the first optical element, and transmitted to the converging element along the first path by being reflected by the first optical element.

26. The projection device according to claim 25, wherein the third color light beam provided by the third light source module further comprises a first green light beam and a second green light beam, and by being reflected by the third optical element, the first green light beam is transmitted to the converging element along the third path, and the second green light beam is transmitted to the converging element along the second path.

27. An illumination system, providing an illumination beam, the illumination system comprising a first light source module, a second light source module, a third light source module, a first optical element, a second optical element, a third optical element, and a converging element, wherein:

the first light source module is configured to provide a first light beam, a second light beam, and a third light beam;

the second light source module is configured to provide a fourth light beam, a fifth light beam, and a sixth light beam;

the third light source module is configured to provide a seventh light beam;

the first optical element is disposed on transmission paths of the first light beam, the second light beam and the third light beam, and the first optical element is configured to allow the first light beam, the second light beam and the third light beam to pass through;

the second optical element is disposed on transmission paths of the second light beam, the third light beam, the fourth light beam, the fifth light beam and the sixth light beam, and the second optical element is configured to reflect a portion of the second light beam and a portion of the fifth light beam, and allow another portion of the second light beam, the third light beam, the fourth light beam, another portion of the fifth light beam and the sixth light beam to pass through, the second light beam is the same color as the fifth light beam; and the third optical element is disposed on transmission paths of the another portion of the second light beam, the another portion of the fifth light beam and the seventh light beam, and the third optical element is configured to reflect the seventh light beam, and allow the another portion of the second light beam, the fourth light beam and the another portion of the fifth light beam to pass through.

28. The illumination system according to claim 27, wherein the first light source module is equal to the second light source module, the first light beam is the same color as the fourth light beam, the third light beam is the same color as the sixth light beam, and the seventh light beam is the same color as the third light beam.

29. The illumination system according to claim 27, wherein the first light source module is configured to further provide a first adjusted light beam, and the first adjusted light beam is the same color as the first light beam.

30. The illumination system according to claim 27, wherein the second light source module is configured to further provide a second adjusted light beam, and the second adjusted light beam is the same color as the fourth light beam.

31. The illumination system according to claim 27, wherein the third light source module is configured to further provide a third adjusted light beam, and the third adjusted light beam is the same color as the seventh light beam.

32. The illumination system according to claim 27, wherein the first light source module comprises at least one first red laser diode, at least one blue laser diode and at least one green laser diode, the second light source module comprises at least one first red laser diode, at least one blue laser diode and at least one green laser diode, and the third light source module comprises at least one green laser diode.

33. The illumination system according to claim 32, wherein the illumination system further comprises a first polarizing element and a second polarizing element, the first polarizing element is disposed between the at least one first red laser diode and the at least one second red laser diode of the first light source module and the first optical element, the second polarizing element is disposed between the at least one first red laser diode and the at least one second red laser diode of the second light source module and the first optical element.

34. The illumination system according to claim 27, wherein the first optical element comprises a first region and a second region, the first region is configured to reflect the fourth light beam and allow the second light beam and the third light beam to pass through, and the second region is configured to allow the first light beam to pass through and reflect the another portion of the fifth light beam and the sixth light beam.

35. The illumination system according to claim 27, wherein the third optical element comprises an optical region for reflecting the seventh light beam and allowing the first light beam and the second light beam to pass through.

36. The illumination system according to claim 35, wherein the third optical element further comprises two transmissive regions, the optical region is connected between the two transmissive regions, and the two transmissive regions are configured to allow light beams to pass through.

* * * * *